US012608592B2

(12) United States Patent
Pang et al.

(10) Patent No.:     US 12,608,592 B2
(45) Date of Patent:     Apr. 21, 2026

(54) AUTOMATED ELECTRIC SUBMERSIBLE PUMP (ESP) FAILURE ANALYSIS

(71) Applicant: Schlumberger Technology Corporation, Sugar Land, TX (US)

(72) Inventors: John Pang, Singapore (SG); Alfredo De La Fuente, Menlo Park, CA (US); Indranil Roychoudhury, Menlo Park, CA (US); Bonang Firmansyah Jusri, Jakarta Selatan (ID); Prashanti Deviani, Pekanbaru (ID); David J. Rossi, Santa Barbara, CA (US); Junadi., Houston, TX (US); Jose Celaya Galvan, Menlo Park, CA (US); Saniya Karnik, Houston, TX (US); Supriya Gupta, Houston, TX (US); Navya Yenuganti, Houston, TX (US); Mahyar Mohajer, Houston, TX (US); Asim Malik, Sugar Land, TX (US); Prasanna Nirgudkar, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 716 days.

(21) Appl. No.: 18/000,845

(22) PCT Filed: Jun. 8, 2021

(86) PCT No.: PCT/US2021/036292
§ 371 (c)(1),
(2) Date: Dec. 6, 2022

(87) PCT Pub. No.: WO2021/252416
PCT Pub. Date: Dec. 16, 2021

(65) Prior Publication Data
US 2023/0212937 A1     Jul. 6, 2023

Related U.S. Application Data

(60) Provisional application No. 63/064,318, filed on Aug. 11, 2020, provisional application No. 63/035,929, filed on Jun. 8, 2020.

(51) Int. Cl.
*G06N 3/0442*     (2023.01)

(52) U.S. Cl.
CPC ................................. *G06N 3/0442* (2023.01)

(58) Field of Classification Search
CPC .... E21B 47/008; E21B 2200/22; F04B 51/00; F04B 47/06; G06N 3/0442; G06N 3/044;
(Continued)

(56) References Cited

U.S. PATENT DOCUMENTS

| 7,979,240 B2 | 7/2011 | Fielder |
| 10,310,128 B1 | 6/2019 | Noui-Mehidi et al. |

(Continued)

OTHER PUBLICATIONS

Khabiri, Elham, et al. "Industry specific word embedding and its application in log classification." Proceedings of the 28th acm international conference on information and knowledge management. 2019. (Year: 2019).*
(Continued)

*Primary Examiner* — Sehwan Kim
(74) *Attorney, Agent, or Firm* — Kyle R. Miiller

(57)     ABSTRACT

A method, apparatus, and program product may utilize data associated with one or more electric submersible pumps (ESPs) to train a machine learning model and/or use a machine learning model to perform ESP failure analysis. In addition, one or more features from the data may be encoded into a machine-readable format to facilitate ingestion by the machine learning model.

20 Claims, 6 Drawing Sheets

(58) Field of Classification Search

CPC ............ G06N 3/045; G06N 3/08; G06N 5/01; G06N 7/01; G06N 20/20

See application file for complete search history.

(56) References Cited

U.S. PATENT DOCUMENTS

| | | | |
|---|---|---|---|
| 10,962,968 B2 | 3/2021 | Al-Maghlouth et al. | |
| 2014/0244552 A1* | 8/2014 | Liu ......................... | G06N 20/00 |
| | | | 706/12 |
| 2015/0354336 A1* | 12/2015 | Maurice ................. | G06Q 50/02 |
| | | | 700/275 |
| 2017/0328194 A1* | 11/2017 | Liu ......................... | G06N 3/088 |
| 2018/0300639 A1* | 10/2018 | Abbas .................... | G06N 20/00 |
| 2020/0104200 A1* | 4/2020 | Kocberber ............. | G06N 3/082 |
| 2020/0218937 A1* | 7/2020 | Visentini Scarzanella .................. |
| | | | G06V 10/774 |
| 2021/0018655 A1* | 1/2021 | Sun ......................... | E21B 43/00 |
| 2021/0041596 A1* | 2/2021 | Kushwaha .............. | G01V 1/306 |
| 2021/0233008 A1* | 7/2021 | Gupta .................... | G06Q 50/02 |
| 2021/0326721 A1* | 10/2021 | Zhang ...................... | G06N 5/04 |
| 2021/0372277 A1* | 12/2021 | Werkheiser ........... | G01L 1/2287 |

OTHER PUBLICATIONS

Zheng, Ling, et al. "Rotating machinery fault prediction method based on Bi-LSTM and attention mechanism." 2019 IEEE International Conference on Energy Internet (ICEI). IEEE, 2019. (Year: 2019).*

Fukuda, Kiyohito, Naoki Mori, and Keinosuke Matsumoto. "A novel sentence vector generation method based on autoencoder and bi-directional LSTM." International Symposium on Distributed Computing and Artificial Intelligence. Cham: Springer International Publishing, 2018. (Year: 2018).*

Yu, Wennian, Il Yong Kim, and Chris Mechefske. "Remaining useful life estimation using a bidirectional recurrent neural network based autoencoder scheme." Mechanical Systems and Signal Processing 129 (2019): 764-780. (Year: 2019).*

Petrovic, Dorde, and Stefana Janicijevic. "Domain specific word embedding matrix for training neural networks." 2019 International Conference on Artificial Intelligence: Applications and Innovations (IC-AIAI). IEEE, 2019. (Year: 2019).*

Sawaryn, S. J. et al., "The Analysis and Prediction of Electric-Submersible-Pump Failures in the Milne Point Field, Alaska", SPE 56663, Society of Petroleum Engineers, presented at the 1999 SPE Annual Technical Conference and Exhibition, Houston, Texas, U.S.A., 12 pages.

Alhanati, F.J.S et al., "ESP Failures: Can We Talk the Same Language?", paper presented a the SPE ESP Workship held in Houston, Texas, U.S.A., Apr. 2021, 11 pages.

Lundberg, S. M et al., "A Unified Approach to Interpreting Model Predictions", 31st Conference on Neural Information Processing Systems, Long Beach, California, U.S.A., 2017, 10 pages.

Saveth, K., "CSI Oilfield: A Guideline to Conduct a Proper ESPCP Dismantle, Inspection & Failure Analysis", Jan. 15, 2018, [retrieved on Dec. 27, 2022]. Retrieved from <http://oilproduction.net/produccion/artificial-lift-systems/pcp-bombas-de-cavidades-progresivas2/item/3669-csi-oilfield-a-guideline-to-conduct-a-proper-espcp-dismantle-inspection-failure-analysis>, pp. 1-14.

Search Report and Written Opinion of International Patent Application No. PCT/US2021/036292 dated Oct. 1, 2021, 12 pages.

International Preliminary Report on Patentability of International Patent Application No. PCT/US2021/036292 dated Dec. 13, 2022, 7 pages.

"Capture of Archive, Web Page of Pycaret, Apr. 24, 2020, [retrieved on Apr. 5, 2023]. Retrieved from <https://pycaret.org/setup/> , pp. 1-3."

"Bujokas, E., "Text Classification Using Word Embeddings and Deep Learning in Python—Classifying Tweets from Twitter", Mar. 14, 2020, [retrieved on Apr. 5, 2023]. Retrieved from <https://medium.com/analytics-vidhya/text-classification-using-wordembeddings-and-deep-learning-in-python-classifying-tweets-from-6fe644fcfc81> pp. 3-11".

"Capture of Archive, Web Page of Machine Learning Mastery, Feb. 28, 2019, [ retrieved on Apr. 5, 2023]. Retrieved from <https://machinelearningmastery.com/lstm-autoencoders/> , p. 1."

Extended Search Report issued in European Patent Application No. 21821132.4 dated May 22, 2024, 13 pages.

Brownlee, J., "A Gentle Introduction to 1-15 LSTM Autoencoders", Machine Learning Mastery, 2018, retrieved from the internet at [https://machinelearningmastery.com/1stm-autoencoders/] on Jul. 27, 2020, 74 pages.

* cited by examiner

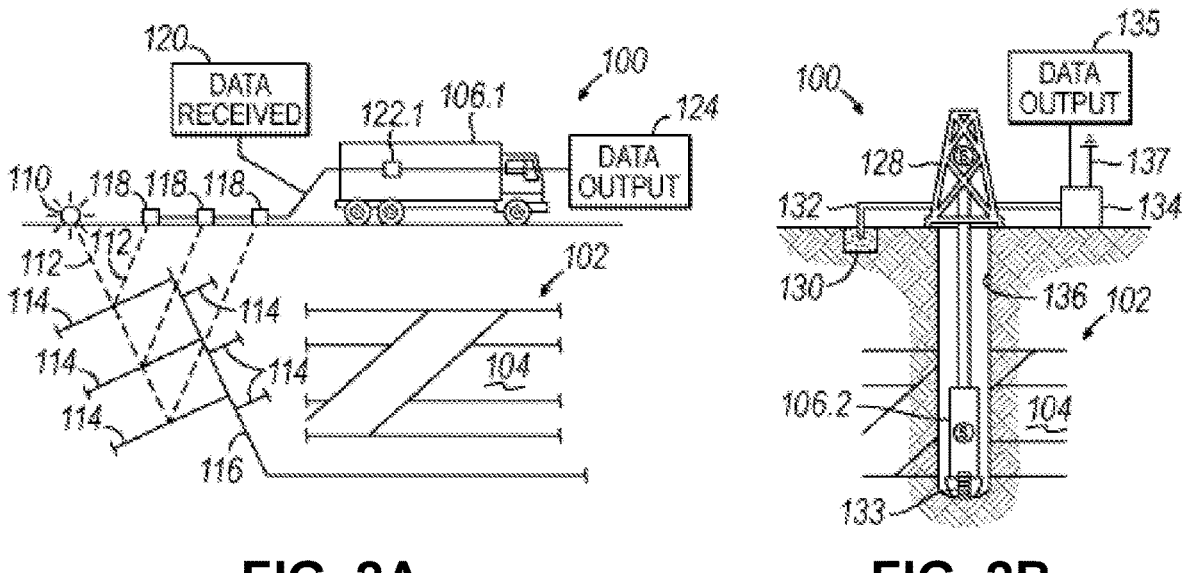
FIG. 2A
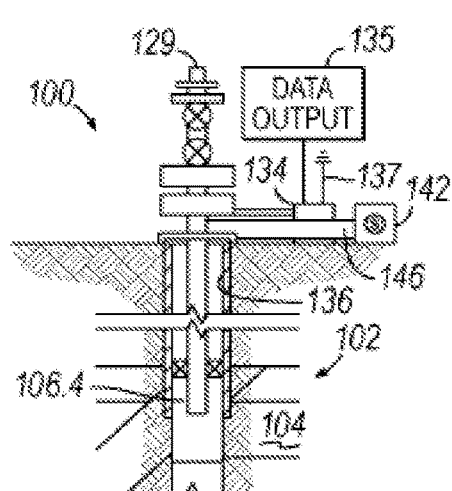
FIG. 2B
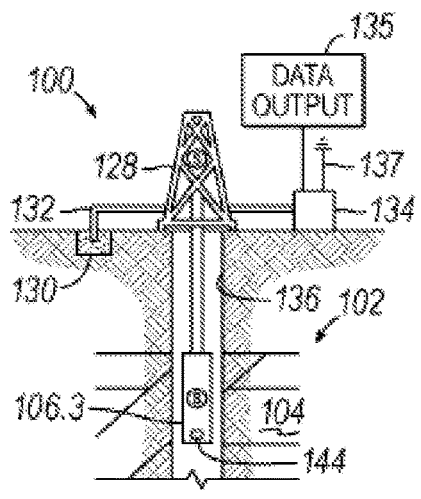
FIG. 2C
FIG. 2D

AUTOMATED ELECTRIC SUBMERSIBLE PUMP (ESP) FAILURE ANALYSIS

CROSS-REFERENCE TO RELATED APPLICATION(S)

This application is a National Stage Entry of International Patent Application No. PCT/US2021/036292, filed on Jun. 8, 2021, which claims priority to U.S. Provisional Patent Application No. 63/035,929, filed on Jun. 8, 2020, and U.S. Provisional Patent Application No. 63/064,318, filed on Aug. 11, 2020, the contents of each are incorporated herein by reference in their entirety.

BACKGROUND

Electrical Submersible Pumps ("ESPs") are the predominant lift method used in many oil and gas fields. ESPs are often operated in harsh environments and under tough operating conditions, which can accelerate aging and failure. In order to better understand such failures and recommend remedial actions, these ESPs are routinely dismantled and inspected to identify not only the root causes of failure, but also the sequences of events starting from the root causes that eventually cause the ESPs to ultimately fail.

Due to the variety of conditions under which these ESPs are installed, failure analysis of ESPs can be a tedious, human-intensive and time-consuming activity. As technology has advanced, ESP failure analysis has evolved from statistical reliability models to failure detection and prediction using signal processing and pattern recognition for high-frequency time-series data. An important input for these approaches is a system for real-time monitoring and failure prediction of ESPs. Information is collected at an accelerating pace today, which has the potential to make signal processing and pattern recognition of high-frequency time-series data increasingly time-consuming. Therefore, a significant need exists in the art for a more automated and efficient process for performing ESP failure analysis.

SUMMARY

The embodiments disclosed herein may provide a method, apparatus, and program product that utilize data associated with one or more electric submersible pumps (ESPs) to train a machine learning model and/or use a machine learning model to perform ESP failure analysis. In addition, one or more features from the data may be encoded into a machine-readable format to facilitate ingestion by the machine learning model.

Therefore, consistent with one aspect of the invention, a method may include receiving data associated with one or more electric submersible pumps (ESPs), encoding features from the received data into a machine-readable format, and using at least a portion of the encoded features to train a machine learning model to perform ESP failure analysis.

In some embodiments, the received data includes one or more of Dismantle Inspect Failure Analysis (DIFA) tracker data, well tracker data and DIFA reports. Also, in some embodiments, the received data includes one or more of pull reason, findings, installation dates, failure dates, pull dates, sensor information, motor information, protector information, immediate cause information, failure component findings, general pull reason general failed component, general failed category, general failure cause, specific pull reason, specific failed component, specific failure category, or specific failure cause.

In addition, some embodiments may further include processing the received data with a data engineering pipeline to process, clean and standardize the received data. Further, in some embodiments, encoding features includes encoding numerical features from the received data. In some embodiments, encoding features includes encoding categorical features from the received data. In addition, in some embodiments, encoding categorical features includes encoding one or more categorical features using one-hot vector encoding. In some embodiments, encoding categorical features includes encoding one or more categorical features using cardinality encoding. In addition, in some embodiments, encoding features includes encoding textual features from the received data.

Moreover, in some embodiments, encoding textual features includes matching one or more unique words for a first textual feature to a set of pretrained oil and gas specific word embeddings to create a first matrix of vocabulary words and corresponding word embeddings, classifying failure components using the first matrix to generate a second matrix of trained word embeddings, matching the second matrix to one or more tokenized sentences, and reducing dimensionality to generate a third compressed embeddings matrix.

In some embodiments, classifying the failure components is performed with a bi-directional Long Short Term Memory (LSTM) recurrent neural network, and reducing dimensionality is performed with an autoencoder neural network. Moreover, in some embodiments, the machine learning model includes an ensemble of multiple machine learning algorithms. In some embodiments, the ensemble of multiple machine learning algorithms includes an XGBoost algorithm, an AdaBoost algorithm, a Random Forest algorithm, a Multinomial Logistic Classifier algorithm and a Neural Network algorithm.

In addition, in some embodiments, the received data is first received data, and the method further includes receiving second data associated with one or more additional ESPs, and processing the second received data using the trained machine learning model to perform ESP failure analysis for the one or more additional ESPs.

Consistent with another aspect of the invention, a method may include receiving data associated with one or more electric submersible pumps (ESPs), the received data including numerical, categorical and textual features, and processing the received data using a multi-input multinomial classification model to predict at least one failure component class or category for an ESP.

In some embodiments, the multi-input multinomial classification model includes a feature engineering pipeline with a bi-directional Long Short Term Memory (LSTM) recurrent neural network and an autoencoder neural network that encodes the textual features and an ensemble of multiple machine learning algorithms configured to receive at least a portion of the numerical, categorical and textual features in the received data.

Consistent with another aspect of the invention, a method may include receiving data associated with one or more electric submersible pumps (ESPs), encoding features from the received data into a machine-readable format, and providing the encoded features to a trained machine learning model to perform failure analysis for the one or more ESPs.

Consistent with another aspect of the invention, an apparatus may include a computing system including one or more processors, and program code configured upon execution by the one or more processors to receive data associated with one or more electric submersible pumps (ESPs), encode features from the received data into a machine-readable format, and use at least a portion of the encoded features to train a machine learning model to perform ESP failure analysis.

Consistent with another aspect of the invention, an apparatus may include a computing system including one or more processors, and program code configured upon execution by the one or more processors, the program code including a data engineering pipeline configured to process, clean and standardize received data associated with one or more electric submersible pumps (ESPs), a feature processing pipeline configured to encode features from the received data into a machine-readable format, the feature processing pipeline configured to encode numerical features, categorical features and textual features from the received data, and a machine learning model trained using at least a portion of the encoded features to perform ESP failure analysis.

Some embodiments may also include an apparatus including a computing system including one or more processors and program code configured upon execution by the one or more processors to perform any of the aforementioned methods. Some embodiments may also include a program product including a non-transitory computer-readable medium and program code stored on the non-transitory computer-readable medium and configured upon execution by a computing system including one or more processors to perform any of the aforementioned methods.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example implementations of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 2A-2D illustrate simplified, schematic views of an oilfield having subterranean formations containing reservoirs therein in accordance with implementations of various technologies and techniques described herein.

DETAILED DESCRIPTION

Figure 1:
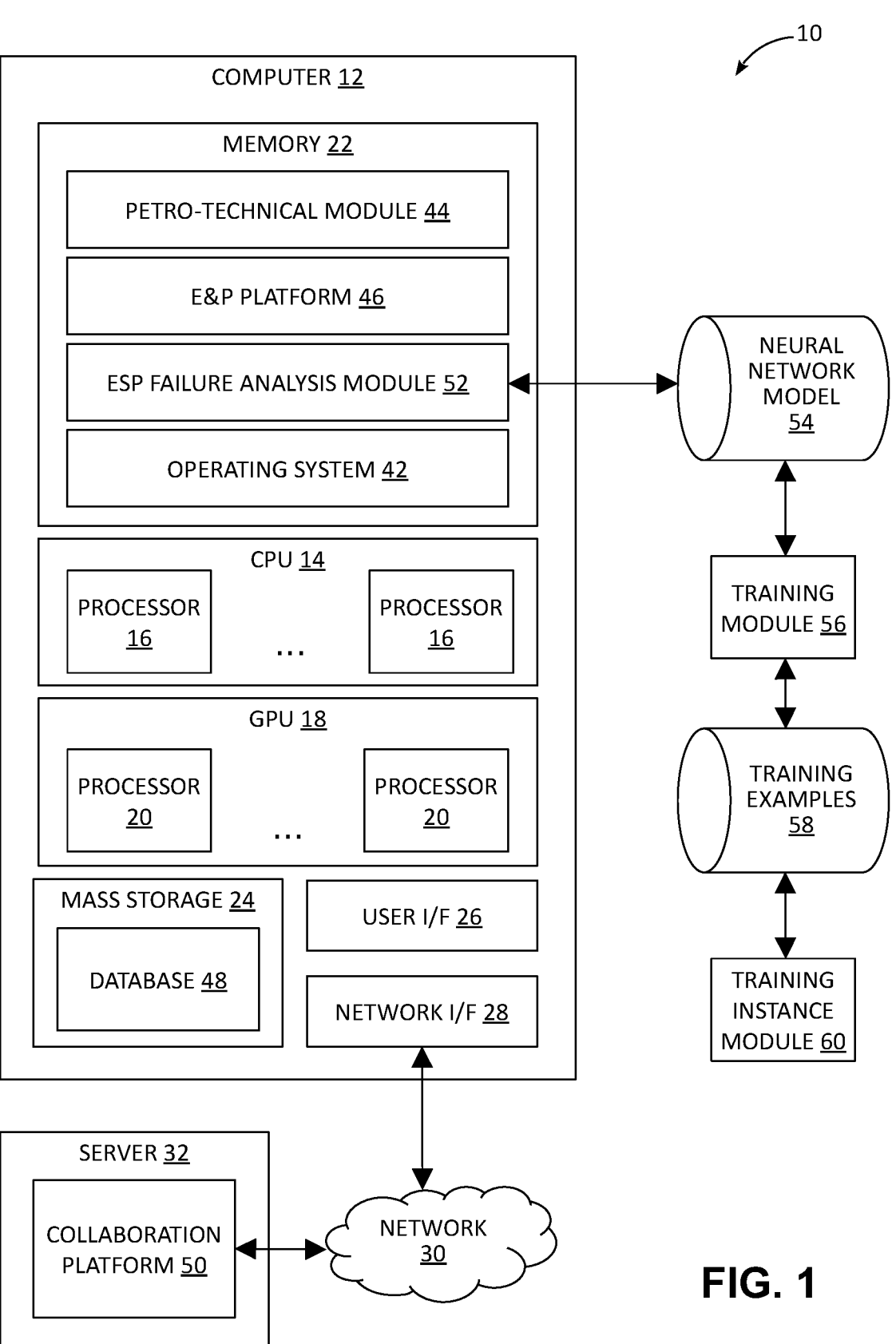
FIG. 1 is a block diagram of an example hardware and software environment for a data processing system in accordance with implementation of various technologies and techniques described herein.

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16 as well as a graphics processing unit (GPU) 18 including at least one hardware based processor or processing core 20, e.g., as may be implemented in integrated graphics or in an external adapter card. CPU 14 is coupled to a memory 22, which may represent the random-access memory (RAM) devices comprising the main storage of a computer 12, as well as any supplemental levels of memory, e.g., cache memories, non-volatile or backup memories (e.g., programmable or flash memories), read-only memories, etc. In addition, memory 22 may be considered to include memory storage physically located elsewhere in a computer 12, e.g., any cache memory in a microprocessor or processing core, as well as any storage capacity used as a virtual memory, e.g., as stored on a mass storage device 24 or on another computer coupled to a computer 12.

Each computer 12 also generally receives a number of inputs and outputs for communicating information externally. For interface with a user or operator, a computer 12 generally includes a user interface 26 incorporating one or more user input/output devices, e.g., a keyboard, a pointing device, a display, a printer, etc. Otherwise, user input may be received, e.g., over a network interface 28 coupled to a network 30, from one or more external computers, e.g., one or more servers 32 or other computers 12. A computer 12 also may be in communication with one or more mass storage devices 24, which may be, for example, internal hard disk storage devices, external hard disk storage devices, storage area network devices, etc.

A computer 12 generally operates under the control of an operating system 42 and executes or otherwise relies upon various computer software applications, components, programs, objects, modules, data structures, etc. For example, a petro-technical module or component 44 executing within an exploration and production (E&P) platform 46 may be used to access, process, generate, modify or otherwise utilize petro-technical data, e.g., as stored locally in a database 48 and/or accessible remotely from a collaboration platform 50. Collaboration platform 50 may be implemented using multiple servers 32 in some implementations, and it will be appreciated that each server 32 may incorporate a CPU, memory, and other hardware components similar to a computer 12.

In one non-limiting implementation, for example, E&P platform 46 may be implemented as the PETREL Exploration & Production (E&P) software platform, while collaboration platform 50 may be implemented as the STUDIO E&P KNOWLEDGE ENVIRONMENT platform, both of which are available from Schlumberger Ltd. and its affiliates. It will be appreciated, however, that the techniques discussed herein may be utilized in connection with other platforms and environments, so the invention is not limited to the particular software platforms and environments discussed herein.

In many implementations, computer 12 includes an ESP failure analysis module 52 that can be utilized in connection with performing ESP failure analysis. Module 52, as will be discussed in greater detail below, may incorporate one or more machine learning or neural network models 54, and in connection with training such models, a training module 56 may utilize one or more training examples 58 generated by a training instance module 60, as will also be discussed in greater detail below.

In general, the routines executed to implement the implementations disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while implementations have and hereinafter will be described in the context of fully functioning computers and computer systems, those skilled in the art will appreciate that the various implementations are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific implementation of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time or stored for later use. The data may also be combined with historical data or other inputs for further analysis. The data may be stored in separate databases or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
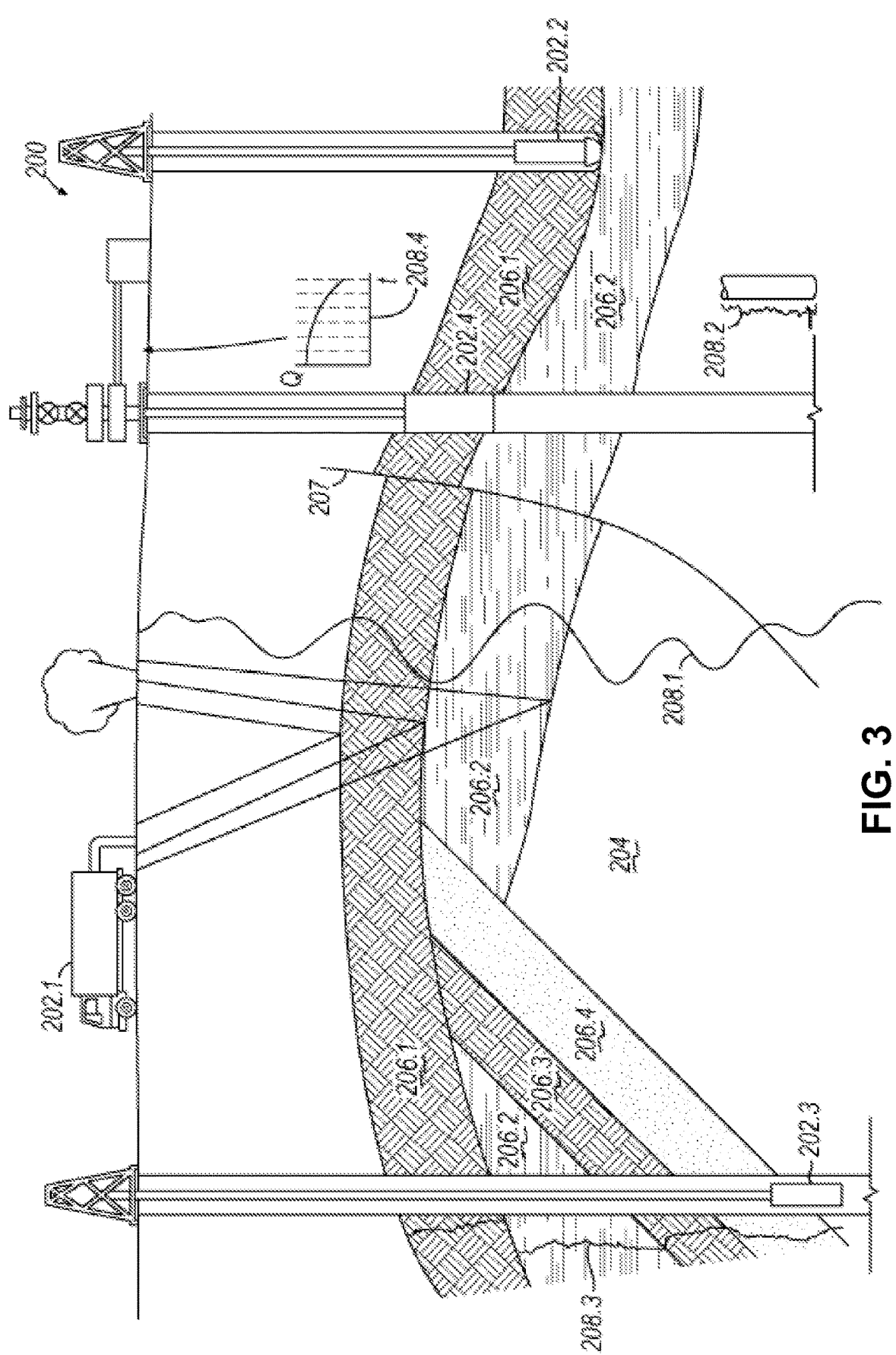
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
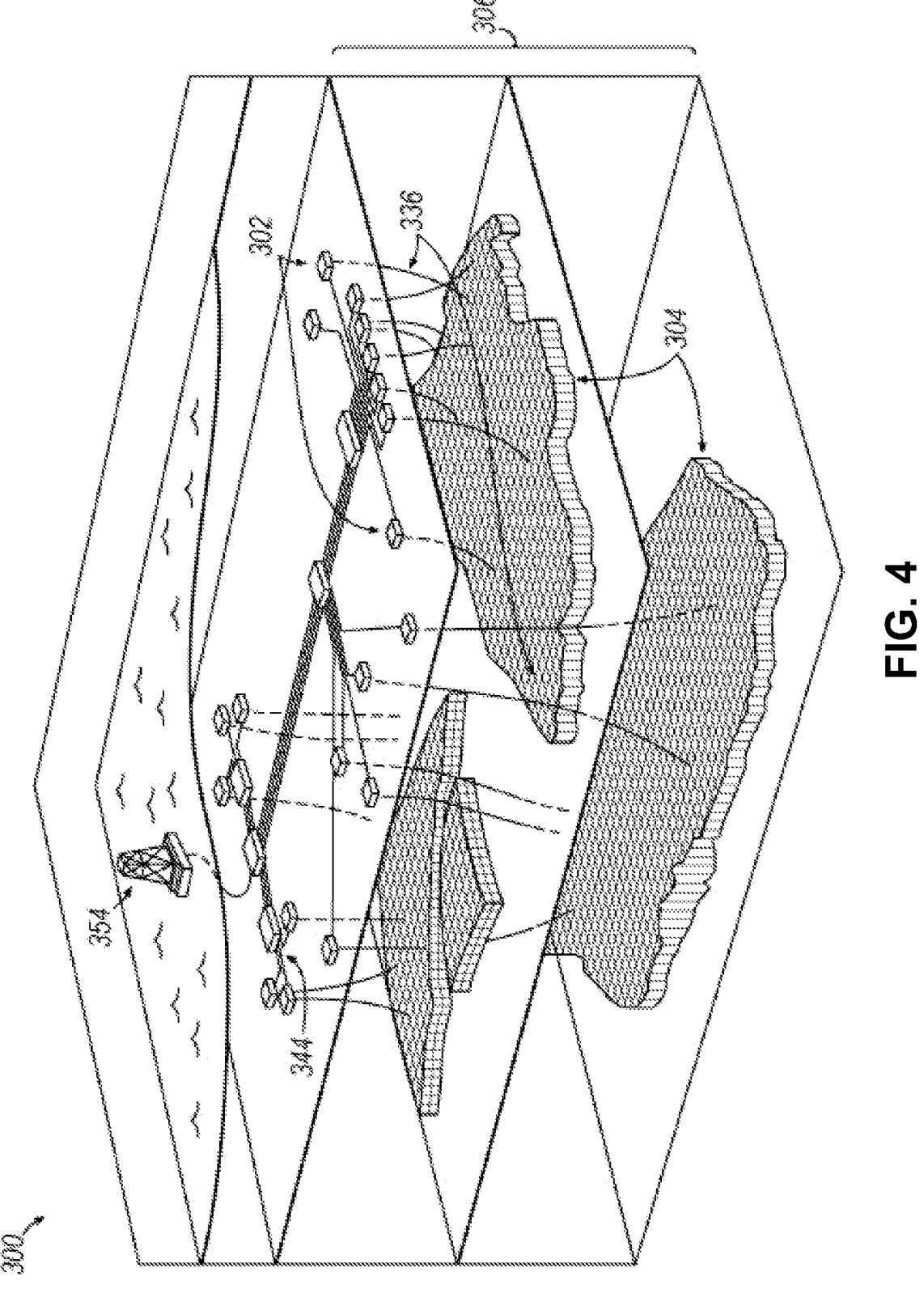
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

ESP Failure Analysis

Embodiments consistent with the invention may be used for ESP failure analysis, e.g., to predict ESP failure component and root cause using well information and historical performance. Currently, ESP failure analysis is a tedious, human-intensive and time-consuming activity involving Dismantle, Inspection and Failure Analysis (DIFA) for each failure. In the illustrated embodiment, an artificial intelligence-based workflow is utilized, incorporating an ensemble of machine learning (ML) algorithms coupled with natural language processing (NLP) to combine both structured and unstructured data across equipment, production, operations and failure reports to automate root cause identification and analysis post breakdown. By doing so, time and human effort may be reduced and process efficiency may be drastically improved.

In particular, in some embodiments consistent with the invention, an ESP failure analysis workflow is used. An initial step in the ESP failure analysis workflow utilizes a data engineering pipeline that facilitates extraction of data from unstructured and structured files and databases. This step consolidates useful information from these various sources and creates a master database that is structured and standardized. The consolidated information in the master database may then be consumed by a feature engineering pipeline that, in some embodiments, automatically detects multiple types of features in the consolidated information in the master database such as numerical, categorical and textual data. The feature engineering pipeline may include various processing algorithms that translate these features to machine readable formats. Then, the translated features may be passed through various machine learning (ML) algorithms to perform failure analysis on ESPs.

Figure 5:
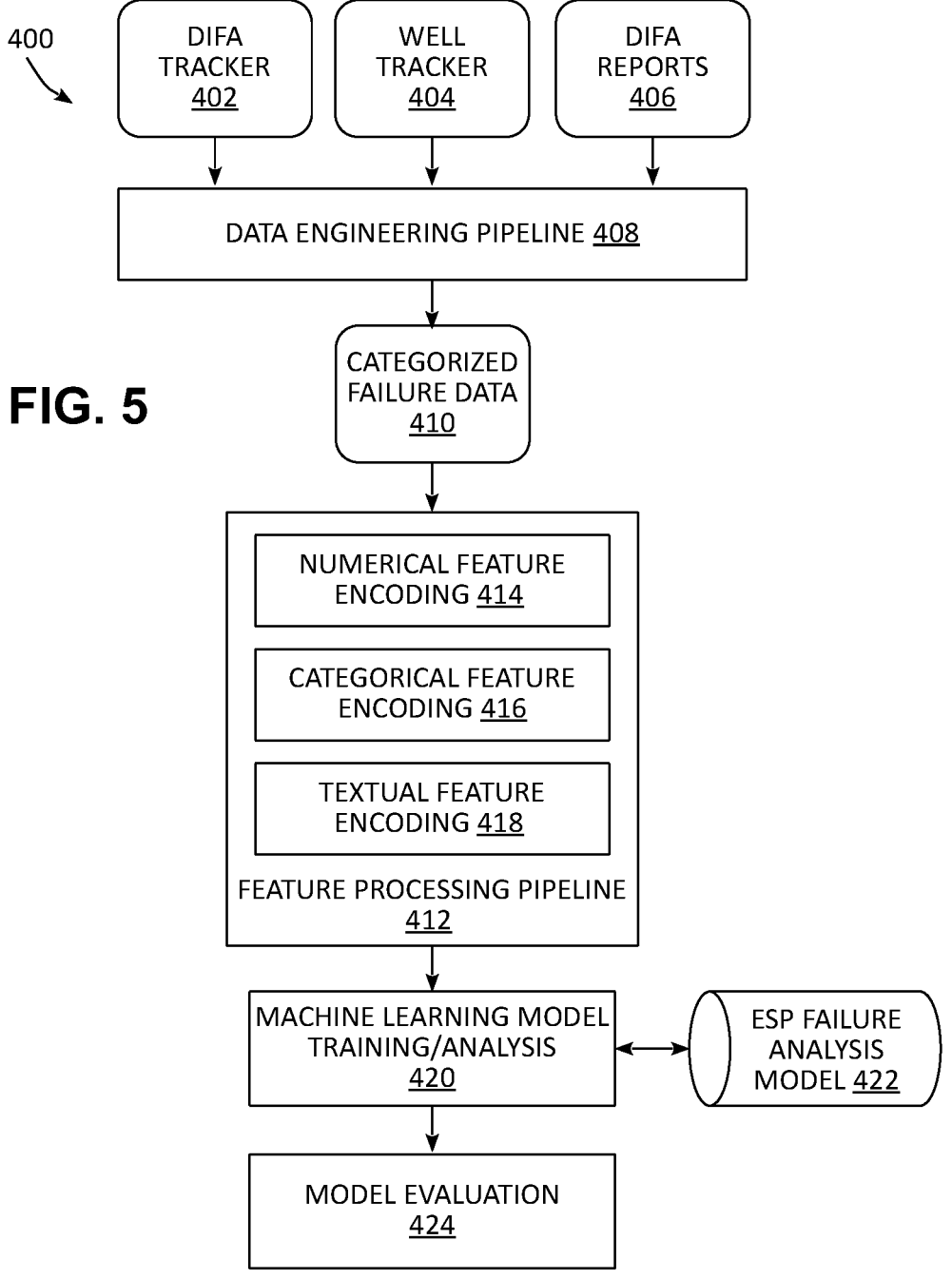
FIG. 5 illustrates an example ESP failure analysis system suitable for implementation of various technologizes and techniques described herein.

Now turning to FIG. 5, this figure illustrates an example data flow and model training pipeline 400 for implementing the various techniques disclosed herein. Workflow 400 is based in part on three primary categories of data, including DIFA tracker data 402, well tracker data 404, and DIFA reports 406, each of which is consumed by a data engineering pipeline 408 to generate a collection of categorized failure data 410. Data engineering pipeline 408 generally extracts and associate's information across multiple data sources (e.g., data sources 402, 404, 406) and categorizes such data into numerical, categorical and textual features.

The categorized failure data 410 is then processed by a feature processing pipeline, which encodes each of the numerical, categorical and textual features represented in the categorized feature data 410 using blocks 414, 416, and 418 respectively into a format suitable for use in training and/or using one or more machine learning models used in ESP failure analysis, e.g., using a machine learning model training/analysis block 420 interfaced with one or more ESP failure analysis models 422. Additionally, as illustrated in block 424, it may also be desirable in some embodiments to performing model evaluation, e.g., by performing analysis to identify various metrics suitable for validating the model.

Referring again to block 408, the data sources used in the illustrated embodiment include DIFA tracker data 402, well tracker data 404 and DIFA reports 406. Each record in the DIFA tracker data 402 provides information on DIFA analysis performed after an ESP failure occurs in a well. On other hand, each record in the well tracker data 404 may have information gathered during the life of an ESP from installation to failure. The DIFA reports 406 may contain findings entered by DIFA engineers during a DIFA process. Table 1 shows some of the types of information that may be included in each data source in some embodiments, although it will be appreciated that other types of information may be used in other embodiments.

TABLE 1

| Features in DIFA, Well Tracker and DIFA Reports | | |
| --- | --- | --- |
| DIFA | Well Tracker | Unstructured DIFA Reports |
| Pull reason | Installation, failure and pull dates | General pull reason |
| Findings | Sensor information | General failed component |
| | Motor information | General failure category |
| | Protector information | General failure cause |
| | Immediate cause | Specific pull reason |
| | Failure component | Specific failed component |
| | Findings | Specific failure category |
| | | Specific failure cause |

In the illustrated embodiment, the DIFA tracker data and well tracker data are structured while the DIFA reports are unstructured data. As such, it is desirable in data engineering pipeline 408 to process, clean and standardize the data, e.g., by correcting disparities in well names and/or pull dates from different data sources. Facts may also be automatically extracted from unstructured DIFA reports and all data sources may be merged together to produce a single file in some embodiments. The implementation of such functionality would be within the skills of an ordinary artisan, as will be appreciated by those of ordinary skill having the benefit of the instant disclosure.

Next, as noted above, feature engineering is performed to encode features from the categorized failure data 410 into a numerical or other machine-readable format suitable for use in machine learning model training and/or use, using blocks 414, 416 and 418 to respectively encode numerical, categorical and textual features. It will be appreciated that a "feature" in some embodiments may be considered to be a column in a data set that represents a property that will assist in some manner with ESP failure analysis.

Numerical feature encoding block 414, for example, may encode numerical features into a suitable numerical format (e.g., to convert between different numerical formats as desired). In some embodiments, however, all numerical features may already be in a suitable format, and block 414 may be omitted, with the numerical features used in their native formats.

Figure 6:
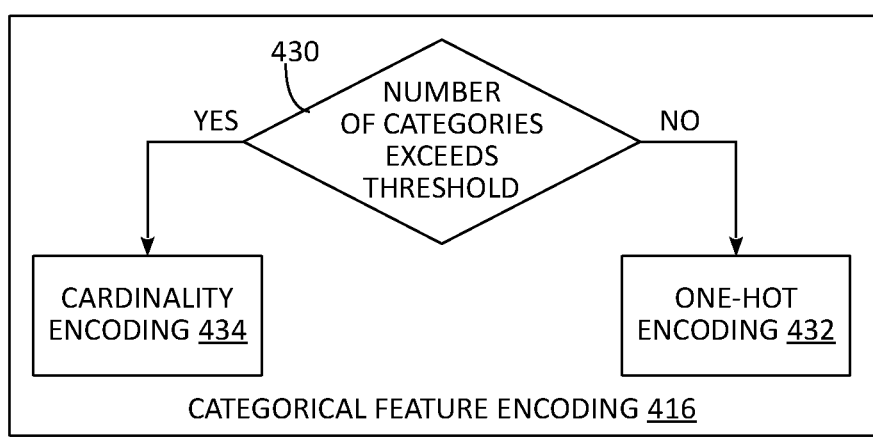
FIG. 6 illustrates an example implementation of the categorical feature encoding block referenced in FIG. 5.

Categorical feature encoding block 416 may encode features into one of multiple categories. In the illustrated embodiment, categorical features may be defined as features that can take a fixed number of possible values, such that each value of a feature may be assigned to a particular group or category. In many cases, these features may be generally represented by text, but because they can be defined as one of a set of particular categories, it may be desirable to instead represent these features in a numerical format. As illustrated in FIG. 6, for example, it may be desirable in some embodiments to encode categorical features to numerical values in two ways, e.g., based upon a minimum threshold to compare with the maximum number of categories among all the categorical features in the data set. Thus, as illustrated by block 430, if the maximum number of categories does not meet (e.g., is less than) the minimum threshold hot vector encoding may be used (block 432), but if the maximum number of categories does meet the threshold (e.g., is greater than or equal to), cardinality encoding may be used (block 434). An example of one-hot encoding would be to assign a bit position in a binary number to a particular category, such that categories 0, 1 and 2 might map to "100", "010" and "001", respectively. An example of cardinality encoding would be to assign a decimal number to each category, e.g., such that categories 0, 1 and 2 would map to corresponding numbers "1,", "2", and "3". Other thresholds and encoding methods may be used to encode different categories in other embodiments, as will be appreciated by those of ordinary skill having the benefit of the instant disclosure.

Returning to FIG. 5, textual feature encoding block 418 may encode textual features. In one embodiment, for example, textual features may be represented as real-valued vectors using a Deep Learning NLP network trained to interpret domain specific (e.g., oil & gas specific) nomenclature.

Textual features in the illustrated embodiment may include unstructured data including sentences, words, special characters, etc. that convey descriptive information that may be relevant to ESP predictive analysis. Natural language processing may be used in some instances to enable machine learning algorithms to read, understand and learn from these sentences in the form in which they are available; however, in the illustrated embodiment, it is desirable to encode these features into a more machine readable format, e.g., in the form of numerical vectors/representations of the sentences/descriptions.

Figure 7:
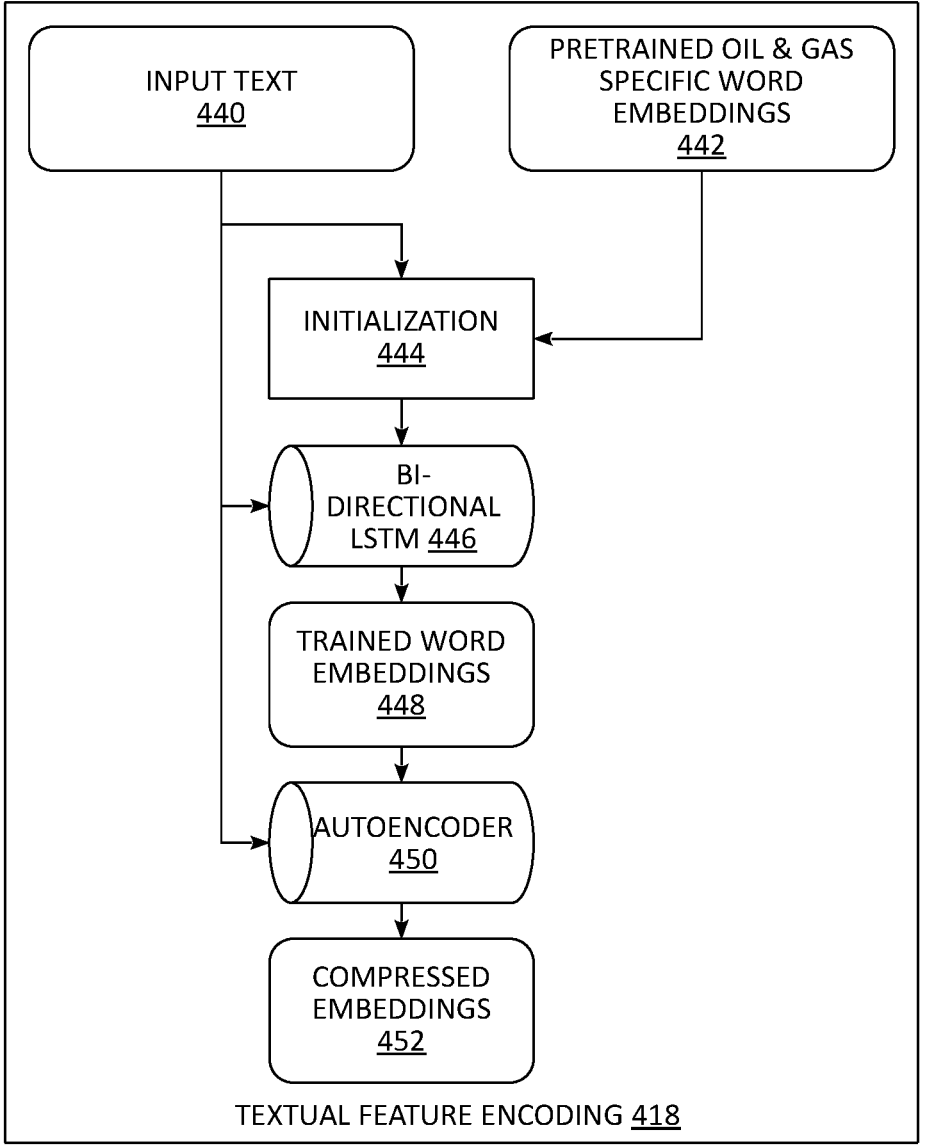
FIG. 7 illustrates an example implementation of the textual feature encoding block referenced in FIG. 5.

FIG. 7, for example, illustrates an example architecture for textual feature encoding block 418 that converts text to equivalent numeric vectors using one or more Long Short Term Memory (LSTM) recurrent neural networks (RNNs) and one or more autoencoder neural networks. Such an architecture is in contrast to an approach that utilizes an open source library such as Doc2Vec to train sentences from scratch, starting with a random initialization, as the latter type of approach may create a limited data set lacking sufficient context and history to adequately learn word embeddings, and because the target on which such an approach may learn is generally randomly chosen from the sentences, which further abstracts the learning process. To address these drawbacks, oil & gas specific word embeddings may be used instead of random initialization and the target labels of the classification task as the objective to train a customization document to a vector model.

Such an architecture may process input text 440 by first using a set of pretrained oil & gas specific word embeddings 442. In one example embodiment, this file is extracted from the repository and includes a matrix of oil & gas specific word embeddings of size 285056×400, where 285056 is the number of pretrained oil & gas words available and 400 is the dimensionality of the word embedding vectors.

Consider, for example, a single textual feature to describe the steps employed by block 418, as it will be appreciated that the same steps can be repeated in the same way for the remaining textual features. For each such feature all of the unique words may be matched with the pretrained matrix of word embeddings in an initialization block 444 to create a matrix of the vocabulary words and their corresponding word embeddings. In addition, whenever any unique word doesn't match with the pretrained word embeddings, that row in the created matrix may be populated with a vector of Os.

This created matrix may then be used as an initialization to the task of classifying failure components, e.g., using a bi-directional LSTM 446 as a model to perform this task and generate a trained word embeddings matrix 448. It has been found that bi-directional LSTM 446 is suitable for this task as LSTMs are readily usable to learn sequence data and bi-directionality enables such a model to learn the sequence from left-right and right-left enabling a deeper understanding of the textual features, thereby enabling the use of initialized word embeddings corresponding with the documents and trained with a classification based objective.

Once the trained word embeddings matrix 448 is obtained, the matrix is matched to tokenized documents/sentences (e.g., documents/sentences where numbers are assigned to unique words and sentences are represented with the numbers instead of the words). This creates a 3D matrix of numbers of sentences×unique words×dimension of embeddings. This 3D matrix is then passed through an autoencoder 450 with the objective of minimizing reconstruction error, thereby invariably learning the dimensionality reduced numerical vector form of the sentences. The encoder of the autoencoder outputs this matrix as a compressed embedding matrix 452, which is the numerical vectors/representation of the sentences, number of sentences×reduced dimension, whereby the autoencoder reduces the dimensionality of the embeddings. Without the autoencoder step each textual embedding would be of length equal to number of words in the sentence×400, which would be a dimensionality of a scale of 1000s which is generally inefficient to train machine learning algorithms. The autoencoder not only significantly reduces the dimensionality but gives the designer an opportunity to tune the best dimension suitable to the use case. In one example embodiment, the reduced dimension is 64, although other dimensions may be used in other embodiments.

Returning again to FIG. 5, in the illustrated embodiment, an ensemble modeling workflow consisting of customized machine learning multi-class predictive models may be trained to select a best model given the data and output a corresponding failure class predicted by the model with best accuracy metrics and rank input parameters by order of importance. In some embodiments, for example, failure classes such as impeller failures, motor lead extension failures, power cable failures, shaft failures, stator failures, and unclassified classes (classes with insufficient data) may be used as prediction outputs of each model.

In particular, after feature pre-processing all relevant features are converted to a numerical form and are ready for the machine learning algorithms to read, understand and learn from the data. An ensemble of multiple machine learning algorithms tuned to suit the classification task at hand may be used in some embodiments to prevent overfitting (i.e., when a model learns too closely or exactly to a particular set of data, and may therefore fail to fit additional data or predict future observations reliably) since there is generally limited data to train the models and test their performance. In one example embodiment, the ensemble may include XGBoost, AdaBoost, Random Forest, Multinomial Logistic Classifier and Neural Network models and/or algorithms. In addition, in some embodiments, from collected and processed data, 70% may be used as a training set, with the remaining 30% used for testing (test set).

The input to the ensemble algorithm in block 420, for example, may be a processed data sheet containing all features in their numerical format, with an objective to train the ensemble model 422 with this data to predict a failure component of an ESP. The workflow in some embodiments may allow for experimentation with multiple types of failure components ranging from just the top 2 and top 3 majority classes to 6 and 8 classes or more. As the number of classes for the algorithm to predict is increased, the data set generally becomes more and more imbalanced, which is a characteristic of the aforementioned data set due to the fact that each class will not contain a uniform number of samples. Such an imbalance in the limited data set may drive the use of an ensemble ML workflow such as described herein, although it will be appreciated that in other embodiments a single machine learning algorithm/model may be used, or alternatively, other combinations of machine learning algorithms/models may be used. In the illustrated embodiment, the first model is XGBoost, which has been found to be useful for a more balanced data set, for example when there are 2-5 different failure classes. AdaBoost has been found to work well when the data is more imbalanced, for instance 6 to 8 classes. The Random Forest classifier may also be included as a basic decision tree-based algorithm. In addition to the tree-based ML algorithms, a multinomial logistic classifier and a shallow neural network classifier may also be included in the ensemble in the illustrated embodiment.

This workflow may be used to output an ESP failure component on unseen test data by choosing the best model from the ensemble which gives the highest prediction accuracy. In some embodiments, the model may be chosen by an operator or may be selected, for example, based upon the number of classes/failure components that the model is expected to predict.

In some embodiments, feature processing pipeline 412, machine learning model training/analysis block 420 and ESP failure analysis model 422 may be collectively considered to be an implementation of a multi-input multinomial classification model, where multi-input signifies that multiple data types may be processed (e.g., numerical, categorical and textual), and where multinomial classification indicates that multiple failure components classes/categories may be predicted.

For the embodiments discussed herein, it has been found that the approach can handle a wide range of input and output features and can automatically classify various parameters into numerical, categorical and textual buckets and perform feature engineering accordingly. In the feature engineering step described above, for example, custom oil and gas specific word embeddings may be obtained using a trained NLP model, and these numerical vectors corresponding to textual features when used in addition to numerical and categorical features for training a multi-class prediction model, may be used to increase the dimensional space for model training and help improve model accuracy. Case studies for two different operators across South-east Asia and North America were performed and model predictions for failure components ranging from 2 to 8 failure types were obtained using the ensemble ML workflow. The model was able to predict with an accuracy of 90%+for 2-3 classes and 75-85% for 4-8 classes. It was observed that as more historical data was added to the model, accuracy continued to improve. Confusion matrix, precision, recall and variable importance graphs were also obtained for every model trained.

As such, embodiments consistent with the invention may be used to process not only structured equipment and production time series data but also to leverage free text information entered by experts during the inspection process in training the algorithms, thus leveraging decades of past failure reports to build predictive models for future analysis. Also, the embodiments focus on predicting specific failure modes and gathering insights into contributing parameters, thereby reducing turnaround time for analysis, improving ESP design and helping to shorten recommendation cycles to next lift selection.

Although the preceding description has been described herein with reference to particular means, materials, and implementations, it is not intended to be limited to the particulars disclosed herein. By way of further example, implementations may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, implementations extend to all functionally equivalent structures, methods, uses, program products, and compositions as are within the scope of the appended claims. It will also be appreciated that training and/or utilization of machine learning models based upon the techniques described herein would be well within the abilities of those of ordinary skill having the benefit of the instant disclosure. In addition, while particular implementations have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method for automating root cause identification of electric submersible pump (ESP) failures post-breakdown, the method comprising:

receiving data associated with at least one ESP, the received data including numerical features, categorical features, and textual features;

encoding the numerical features, the categorical features, and the textual features of the received data into a machine-readable format, the encoding including:

encoding the numerical features using a data engineering pipeline to generate standardized numerical values;

encoding the categorical features using one-hot vector encoding or cardinality encoding based on a threshold comparison against a number of categories; and encoding the textual features by:

matching one or more non-repeated words for a first textual feature of the textual features to a set of pretrained oil and gas specific word embeddings to create a first matrix of vocabulary words and corresponding word embeddings;

classifying failure components using the first matrix to generate a second matrix of trained word embeddings;

matching the second matrix to one or more tokenized sentences; and reducing dimensionality of the matched second matrix to generate a third compressed embeddings matrix, wherein the classifying the failure components is performed with a bi-directional Long Short Term Memory (LSTM) recurrent neural network, and wherein the reducing the dimensionality of the matched second matrix is performed with an autoencoder neural network; and predicting at least one failure component of the at least one ESP using the encoded numerical features, the encoded categorical features, and the encoded textual features with a trained multi-input multinomial classification model, wherein the multi-input multinomial classification model has been trained using second numerical features, second categorical features, and second textual features from at least one other ESP.

2. The method of claim 1, wherein the received data further includes one or more of: Dismantle Inspect Failure Analysis (DIFA) tracker data, well tracker data, or DIFA reports.

3. The method of claim 1, wherein the received data further includes one or more of: a pull reason, findings, installation dates, failure dates, pull dates, sensor information, motor information, protector information, immediate cause information, failure component findings, a general pull reason, a general failed component, a general failed category, a general failure cause, a specific pull reason, a specific failed component, a specific failure category, or a specific failure cause.

4. The method of claim 1, further comprising processing the received data with a data engineering pipeline to process, clean, and standardize the received data.

5. The method of claim 1, wherein the trained multi-input multinomial classification model comprises an ensemble of multiple machine learning algorithms.

6. The method of claim 5, wherein the ensemble of multiple machine learning algorithms includes at least two of: an XGBoost algorithm, an AdaBoost algorithm, a Random Forest algorithm, a Multinomial Logistic Classifier algorithm, or a Neural Network algorithm.

7. The method of claim 1, wherein:

the received data is first received data; and the method further comprises:

receiving second data associated with one or more additional ESPs; and processing the received second data using the trained multi-input multinomial classification model to predict at least one failure component of the one or more additional ESPs.

8. An apparatus, comprising:
a computing system including one or more processors; and
a memory storing program code that, upon execution by the one or more processors, causes the apparatus to perform the method of claim 1.

9. A non-transitory computer-readable medium having program code stored thereon, the program code configured to, upon execution by a computing system including one or more processors, cause the one or more processors to perform the method of claim 1.

10. A method for automating root cause identification of electric submersible pump (ESP) failures post-breakdown, the method comprising:
receiving data associated with at least one ESP, the received data including numerical features, categorical features, and textual features;
encoding the numerical features, the categorical features, and the textual features of the received data into a machine-readable format, the encoding including:
encoding the numerical features using a data engineering pipeline to generate standardized numerical values;
encoding the categorical features using one-hot vector encoding or cardinality encoding based on a threshold comparison against a number of categories; and
encoding the textual features by:
matching one or more non-repeated words for a first textual feature of the textual features to a set of pretrained oil and gas specific word embeddings to create a first matrix of vocabulary words and corresponding word embeddings;
classifying failure components using the first matrix to generate a second matrix of trained word embeddings;
matching the second matrix to one or more tokenized sentences; and
reducing dimensionality of the matched second matrix to generate a third compressed embeddings matrix,
wherein the classifying the failure components is performed with a bi-directional Long Short Term Memory (LSTM) recurrent neural network, and
wherein the reducing the dimensionality of the matched second matrix is performed with an auto-encoder neural network; and
predicting at least one failure component class or category of the at least one ESP using the encoded numerical features, the encoded categorical features, and the encoded textual features with a trained multi-input multinomial classification model.

11. The method of claim 10, wherein the trained multi-input multinomial classification model includes an ensemble of multiple machine learning algorithms configured to receive at least a portion of the numerical features, the categorical features, and the textual features in the received data.

12. A method for automating root cause identification of electric submersible pump (ESP) failures post-breakdown, the method comprising:
receiving data associated with at least one ESP, the data including numerical features, categorical features, and textual features;

encoding the numerical features, the categorical features, and the textual features of the received data into a machine-readable format, the encoding including respective pathways for each of the numerical features, the categorical features, and the textual features, the pathways including:
for the numerical features, encoding the numerical features using a data engineering pipeline to generate standardized numerical values;
for the categorical features, encoding the categorical features using one-hot vector encoding or cardinality encoding based on a threshold comparison against a number of categories; and
for the textual features, encoding the textual features by:
matching one or more non-repeated words for a first textual feature of the textual features to a set of pretrained specific word embeddings to create a first matrix of vocabulary words and corresponding word embeddings;
classifying failure components using the first matrix to generate a second matrix of trained word embeddings;
matching the second matrix to one or more tokenized sentences; and
reducing dimensionality of the matched second matrix to generate a third compressed embeddings matrix,
wherein the classifying the failure components is performed with a bi-directional Long Short Term Memory (LSTM) recurrent neural network, and
wherein the reducing the dimensionality of the matched second matrix is performed with an auto-encoder neural network; and
predicting at least one failure component of the at least one ESP using the encoded numerical features, the encoded categorical features, and the encoded textual features with a trained multi-input multinomial classification model.

13. An apparatus for automating root cause identification of electric submersible pump (ESP) failures post-breakdown, comprising:
a computing system including one or more processors; and
a non-transitory computer-readable medium storing program code that, upon execution by the one or more processors, causes the apparatus to:
receive data associated with at least one ESP, the received data including numerical features, categorical features, and textual features;
encode the numerical features, the categorical features, and the textual features of the received data into a machine-readable format, the encoding including:
encoding the numerical features using a data engineering pipeline to generate standardized numerical values;
encoding the categorical features using one-hot vector encoding or cardinality encoding based on a threshold comparison against a number of categories; and
encoding the textual features by:
matching one or more non-repeated words for a first textual feature of the textual features to a set of pretrained oil and gas specific word embeddings to create a first matrix of vocabulary words and corresponding word embeddings;

classifying failure components using the first matrix to generate a second matrix of trained word embeddings;

matching the second matrix to one or more tokenized sentences; and reducing dimensionality of the matched second matrix to generate a third compressed embeddings matrix, wherein the classifying the failure components is performed with a bi-directional Long Short Term Memory (LSTM) recurrent neural network, and wherein the reducing the dimensionality of the matched second matrix is performed with an autoencoder neural network; and predict at least one failure component of the at least one ESP using the encoded numerical features, the encoded categorical features, and the encoded textual features with a trained multi-input multinomial classification model, wherein the multi-input multinomial classification model has been trained using second numerical features, second categorical features, and second textual features from at least one other ESP.

14. The apparatus of claim 13, wherein the received data further includes one or more of: Dismantle Inspect Failure Analysis (DIFA) tracker data, well tracker data, or DIFA reports.

15. The apparatus of claim 13, wherein the received data further includes one or more of: a pull reason, findings, installation dates, failure dates, pull dates, sensor information, motor information, protector information, immediate cause information, failure component findings, a general pull reason, a general failed component, a general failed category, a general failure cause, a specific pull reason, a specific failed component, a specific failure category, or a specific failure cause.

16. The apparatus of claim 13, wherein the program code further causes the apparatus to generate a data engineering pipeline configured to process, clean, and standardize the received data.

17. The apparatus of claim 13, wherein the trained multi-input multinomial classification model comprises an ensemble of multiple machine learning algorithms.

18. The apparatus of claim 17, wherein the ensemble of multiple machine learning algorithms includes at least two of: an XGBoost algorithm, an AdaBoost algorithm, a Random Forest algorithm, a Multinomial Logistic Classifier algorithm, or a Neural Network algorithm.

19. The apparatus of claim 13, wherein:

the received data is first received data; and the program code further causes the apparatus to:

receive second data associated with one or more additional ESPs; and process the received second data using the trained multi-input multinomial classification model to predict at least one failure component of the one or more additional ESPs.

20. An apparatus for automating root cause identification of electric submersible pump (ESP) failures post-breakdown, comprising:

a computing system including one or more processors; and a memory storing program code that, when executed by the one or more processors, causes the one or more processors to:

process, clean, and standardize received data associated with at least one ESP, the received data including numerical features, categorical features, and textual features;

encode the numerical features, the categorical features, and the textual features of the received data into a machine-readable format, the encoding including:

encoding the numerical features using a data engineering pipeline to generate standardized numerical values;

encoding the categorical features using one-hot vector encoding or cardinality encoding based on a threshold comparison against a number of categories; and encoding the textual features by:

matching one or more non-repeated words for a first textual feature of the textual features to a set of pretrained oil and gas specific word embeddings to create a first matrix of vocabulary words and corresponding word embeddings;

classifying failure components using the first matrix to generate a second matrix of trained word embeddings;

matching the second matrix to one or more tokenized sentences; and reducing dimensionality of the matched second matrix to generate a third compressed embeddings matrix, wherein the classifying the failure components is performed with a bi-directional Long Short Term Memory (LSTM) recurrent neural network, and wherein the reducing the dimensionality of the matched second matrix is performed with an autoencoder neural network; and predict at least one failure component of the at least one ESP using the encoded numerical features, the encoded categorical features, and the encoded textual features with a trained multi-input multinomial classification model, wherein the multi-input multinomial classification model has been trained using second numerical features, second categorical features, and second textual features from at least one other ESP.

* * * * *